United States Patent
Li

(10) Patent No.: US 8,368,692 B2
(45) Date of Patent: Feb. 5, 2013

(54) CLIPPING GEOMETRIES IN RAY-CASTING

(75) Inventor: Wei Li, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1066 days.

(21) Appl. No.: 12/120,329

(22) Filed: May 14, 2008

(65) Prior Publication Data

US 2009/0102842 A1    Apr. 23, 2009

Related U.S. Application Data

(60) Provisional application No. 60/981,220, filed on Oct. 19, 2007.

(51) Int. Cl.
*G06T 15/40* (2006.01)

(52) U.S. Cl. ........ 345/422; 345/421; 345/620; 345/621; 345/622; 345/623; 345/624

(58) Field of Classification Search .................. None
See application file for complete search history.

(56) References Cited

U.S. PATENT DOCUMENTS

| | | | |
|---|---|---|---|
| 5,249,264 A * | 9/1993 | Matsumoto | ............ 345/624 |
| 5,579,455 A | 11/1996 | Greene | |
| 6,937,244 B2 | 8/2005 | Hong | |
| 2007/0237038 A1 | 10/2007 | Li | |

OTHER PUBLICATIONS

Lisa M. Sobirajski and Ricardo S. Avila, "A Hardware Acceleration Method for Volumetric Ray Tracing", 1995, IEEE, Proceedings of the 6$^{th}$ IEEE Visualization Conference (Visualization '95), pp. 27-34.*
Daniel Weiskopf, Klaus Engel, Thomas Ertl, "Interactive Clipping Techniques for Texture-Based Volume Visualization and Volume Shading", Sep. 2003, IEEE, IEEE Transactions on Visualization and Computer Graphics, vol. 9, No. 3, pp. 298-312.*
Marc Neinhaus and Juergen Doeliner,"Edge-Enhancement—An Algorithm for Real-Time Non-Photorealistic Rendering", Feb. 7, 2003, Union Agency—Science Press, Journal of WSCG, vol. 11, No. 1.*

* cited by examiner

*Primary Examiner* — Ulka Chauhan
*Assistant Examiner* — Robert Bader

(57) ABSTRACT

A computer implemented method for creating a depth range buffer for supporting clipping geometries for ray-casting includes inputting image data, establishing a depth range buffer for specifying a start and an end point of each ray, computing a near depth of the image data corresponding to the start point of each ray, computing a far depth of the image data corresponding to the end point of each ray, clipping the volume by restricting ray-casting within the start and end points of the depth range buffer, and rendering a portion of the image data corresponding to the visible depth range.

14 Claims, 4 Drawing Sheets

CLIPPING GEOMETRIES IN RAY-CASTING

CROSS-REFERENCE TO RELATED APPLICATIONS

This application claims the benefit of Provisional Application No. 60/981,220 filed on Oct. 19, 2007 in the United States Patent and Trademark Office, the contents of which are herein incorporated by reference in its entirety.

BACKGROUND OF THE INVENTION

1. Technical Field

The present disclosure relates to image processing, and more particularly to a system and method for supporting clipping geometries for graphics processing unit (GPU) based ray-casting.

2. Description of Related Art

As GPUs become more powerful and programmable, implementing ray-casting directly on a GPU has become possible. For example, for volume rendering, GPU-based ray-casting has shown better performance and more flexibility in achieving various shading effects in comparison with slice-based approaches.

As compared to a GPU ray-caster, a slice-based volume renderer (also referred to as a slicer) renders a set of parallel slices, wherein each slice is defined by a proxy polygon. The vertices of the polygon specify the 3D locations of the slice in 3D space and texture coordinates of these vertices describe how volume samples are mapped onto the polygon. A GPU fragment within a slice can be considered as a single 3D point. In contract, the GPU ray-caster renders the front faces of a volume (or sub-volume) and each GPU fragment represents a ray segment with significant length. The output corresponding to a fragment is obtained by accumulating multiple volume samples along the ray. When there are clipping geometries such as cut-planes or crop-box, the fragments in a slicer are clipped individually, while the ray-segment in ray-caster could be partially clipped.

Typically, the clipping of fragments in a slicer is done outside the GPU shader either through hardware clip-planes or software clip-planes that adjust proxy polygons. For GPU ray-caster, a fragment cannot be clipped as a whole. One proposed solution moves the clip testing into the shader and applies clipping for each volume sample. This requires passing all the clip-plane information as parameters into the GPU shader program. The per-sample-cost inside the shader is incremented and affects the overall frame rate. Further, the number of clip-planes for a scene is a variable which makes it is difficult to pass plane parameters efficiently to the GPU shader.

In ray-casting, for each pixel of an image, a ray is shot from a camera passing through the center of the pixel and accumulating lighting contributions along the ray. For a polygonal model, intersections of the ray with surfaces of the model, and visible color and lighting effects at the intersection point are determined. For volumetric model, the image data is sampled at discrete positions along the ray. Each color-mapped sample plus shading effects are composited. The accumulated color is then used as the value of the pixel. When all pixel values are obtained, the image is rendered.

A traditional volume rendering method that has been widely used on graphics hardware is the slicing approach, also referred to as a slicer. Instead of accumulating sample colors along the rays, a set of parallel planes are defined. By intersecting those parallel planes with the bounding box of the volume, a set of polygons are generated. Mapping the volume as a texture onto the polygons is equivalent to extracting parallel slices from the dataset. These slices are then rendered as texture-mapped polygons in sequence. In other words, a slicer renders slice-by-slice, while a ray-caster renders ray-by-ray. In some sense, a slicer renders a volume as a set of polygons.

Both the slicer and ray-caster can be accelerated by a GPU. A typical GPU pipeline takes polygons and associated attributes, such as texture, as input. The polygons and their attributes are rasterized to generate fragments. Fragments are aligned with the pixels in the resulting image. The value of every pixel is then determined according to the fragments falling on to it.

One difference between a slicer (as well as a surface renderer) and a ray-caster is that, in a slicer, each fragment represents a point in 3D space, while in a ray-caster a fragment corresponds to a ray segment of non-ignorable length. As a result, the implementation of clipping geometries, such as cut-planes and crop-boxes is different for slicer and ray-caster. A cut-plane, also called a clip-plane, is an infinite plane that excludes all the voxels falling on one side of the plane while keep the others. A crop-box could be replaced by six volume-aligned cut-planes. For slicer, each fragment is clipped as a single element, that is, a fragment is either completely clipped or completely unclipped. Therefore, cut-planes in slicer can be achieved either through hardware clip-planes or through software cut-planes. In the latter case, the polygons are intersected with cut-planes in CPU to create clipped and smaller polygons before rendering. This however won't work for ray-caster, since each fragment includes multiple samples distributed along a ray segment. These ray samples need to be clipped individually.

One proposed solution to supporting cut-planes in ray-caster is to pass all cut-plane equations as parameters to fragment program and to modify the GPU fragment shader program, so that the clipping condition is tested before fetching each sample. If a sample is clipped, it is then excluded from contributing to the pixel color. This requires inserting additional code statements into the ray-cast fragment program, and the clipping test is applied to all samples, which may be expensive. In addition, the number of cut-planes in a scene is a variable; hence it is difficult to pass all plane equations efficiently.

Therefore, a need exists for a system and method for supporting clipping geometries for GPU-based ray-casting.

SUMMARY OF THE INVENTION

According to an embodiment of the present disclosure, a computer implemented method for creating a depth range buffer for supporting clipping geometries in ray-casting includes receiving image data to be rendered, the image data comprising an existing depth buffer, determining a depth range buffer comprising a first depth buffer for start points and a second depth buffer for end points corresponding to the start points, a pair a start and end points defining a path of a ray, wherein the depth range buffer is obtained by determining all bounding geometries from the existing depth buffer of the image data, and rendering a clipped view of the image data by restricting ray-casting within a depth range defined by the depth range buffer.

According to an embodiment of the present disclosure, a computer implemented method for creating a depth range buffer for supporting clipping geometries for GPU-based ray-casting includes inputting image data, establishing a depth range buffer for specifying a start and an end point of each ray, computing a near depth of the image data corresponding to the start point of each ray, computing a far depth of the image data corresponding to the end point of each ray, clipping the volume by restricting ray-casting within the start and end points of the depth range buffer, and rendering a portion of the image data corresponding to the visible depth range.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
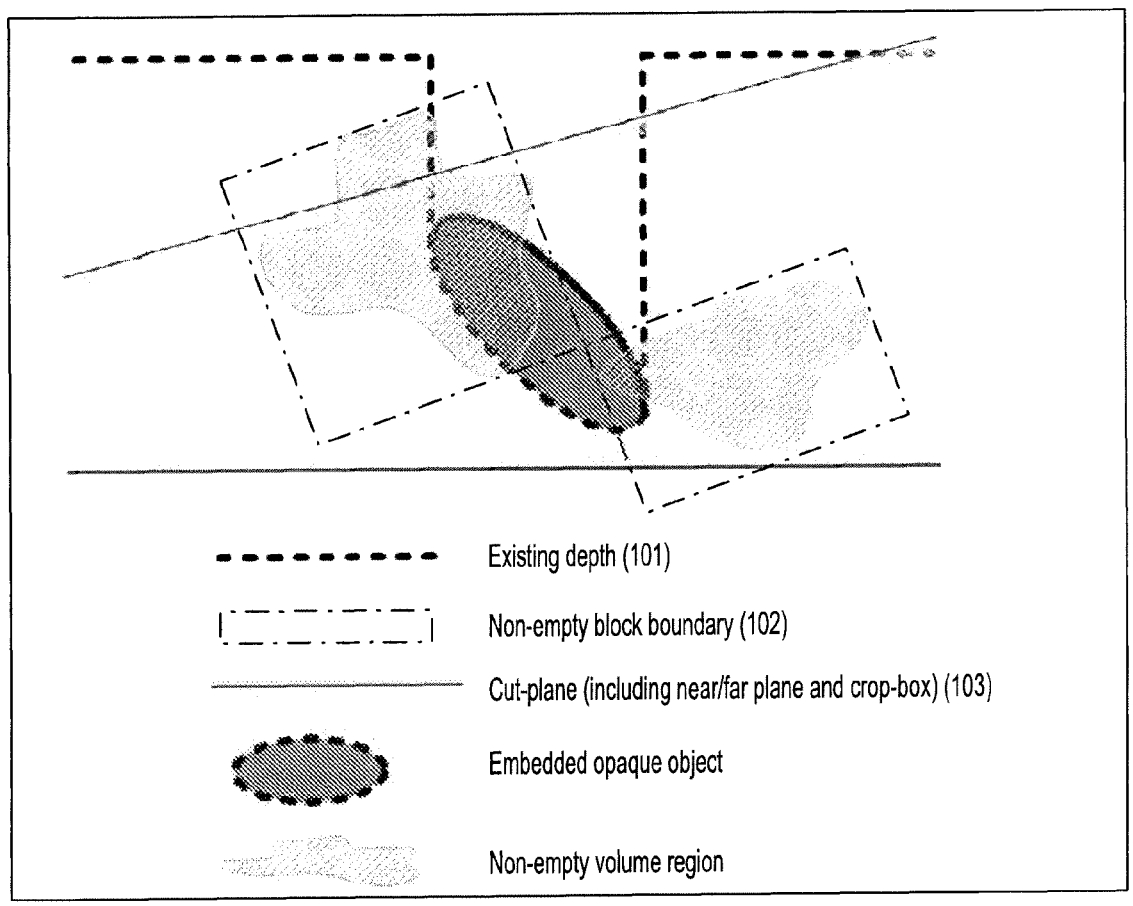
FIG. 1 is boundary geometry for ray casting according to an embodiment of the present disclosure.

An approach for supporting clipping geometries, such as cut-planes and crop-box in ray-casting, which is particularly suitable for graphics processing unit (GPU) based ray-casting—generating 2D images from a 3D scene (e.g., image data). Clipping geometries, bounding box of non-empty blocks, and depth buffer of embedded objects are rendered into a depth range buffer that specifies the start and end points of each ray. Clipping is then achieved by restricting ray-casting within the depth range or range layers. The clipping substantially avoids the cost of per-sample clipping tests and the inefficiency of passing clipping information into the ray-casting GPU program.

According to an embodiment of the present disclosure, a system and method is implemented for GPU-based ray-casting using a ray-caster that supports arbitrary number of clip-planes plus a volume-aligned crop-box. It also excludes volume samples falling behind embedded objects. Rendering cost inside GPU shader is not increased according to an embodiment of the present disclosure. Clipping geometries are rendered to find the visible depth range of the volume and rays are case only within the visible depth range. This is in a preprocessing step before rendering each frame of image.

One feature of cut-planes utilized is that each cut-plane excludes a half space and the intersection of arbitrary number of clip-planes defines a convex-shaped region. The region could be null. An axis-aligned bounding box can be considered as composed of six clip-planes. The near and far planes of the viewing volume are added to the bounding geometry. For any convex-shaded object, the depth complexity is either 0 or 2. After this preprocesses step, a depth range buffer is obtained of which each pixel either contains a flags indicating that the scene will not contribute to the corresponding pixel in frame buffer, or contains two depth values that defines the start and end positions of a ray.

According to an embodiment of the present disclosure, an efficient approach to supporting cut-planes in ray-caster supports arbitrary number of cut-planes, a crop-box for ray-casting, and embedded opaque objects. Instead of evaluating the clipping function for each individual samples inside the fragment program, all bounding geometries are rendered, such as the cut-planes, bounding boxes, near and far planes, and depth of embedded objects in a preprocessing step to obtain a depth range buffer. The depth range buffer contains two depth buffers, whose values specify the starting and end point for each ray segment. In the ray-casting, rays start from a near depth (e.g., from a given point of view of a camera viewing a scene) and ends at a far depth (e.g., away from the given point of view the camera viewing the scene). According to an embodiment of the present disclosure, a method implements the feature and accelerates the rendering when the clipping geometries reduce the depth range as well as the total number of voxel samples that the ray-caster accesses.

Near and far depth values accelerate ray-casting and are utilized for an efficient cut-plane and crop-box implementation. According to an embodiment of the present disclosure, a method marries with empty-space-skipping utilizing the near and far depth values. For a ray-cast system that utilizes the dual-depth buffer to accelerate rendering, the method does not require any change to a ray fragment program for GPU ray-caster or a ray traversal loop for CPU ray-caster—rather the method modifies the generation of the depth range buffer.

In a system according to an embodiment of the present disclosure, the bounding information may include: 1) non-empty block boundary, 2) clipping geometry, and 3) existing depth buffer. Non-empty blocks are a set of volume-aligned boxes that define the visible sub-volumes of the dataset. The emptiness of a voxel is determined by the voxel value and a transfer function only. It is independent from the viewing angle, the view volume, or the clipping geometry, such as the cut-planes or crop box. Therefore, for a given dataset, the non-empty block boundary will not change, unless the transfer function changes. Each non-empty block defines a box-shaded region that needs to be rendered, and the union of all the blocks defines the entire non-empty region. As mentioned before, utilizing non-empty blocks to speed up rendering has been exploited in previous work.

The following may be considered as the clipping geometry

User defined cut-planes

Crop-box

Near and far plane

As mentioned, a crop-box can be considered as six cut-planes, and near/far planes are inherent cut-planes associated with any scene. Therefore, the three type of clipping geometry are treated similarly. For each plane, a flat polygon is rendered to reduce the depth range. Each plane removes a half-space as the clipped region, and leaves the other half as the non-clipped region.

When an application requires embedding certain opaque objects inside a volume, these objects are rendered before volume rendering, and the depth buffer are updated to the nearest depth of these objects. Any voxel falling behind these depths should be excluded from rendering. In other words, the existing depth buffer before volume rendering specifies an upper bound of the far buffer that the rays should not go beyond.

All bounding information is converted, into depth ranges, and the depth range values are used in ray-casting, so that the ray-casting fragment or ray traversal application programs do not deal with the specialties of different types of clipping and different numbers of clipping objects.

The representation of clipping geometry and the existing depth buffer after conversion should be accurate, because they clearly define whether a volume sample should be excluded from rendering.

The non-empty block boundaries are needed for acceleration. So long as the non-empty block boundaries enclose all non-empty voxels, the result will be correct. Therefore, the bounding geometries of these non-empty voxels may be adjusted to leverage the complexity of the geometry and the number of empty voxels enclosed. Including more empty voxels slows down the rendering, while increasing the complexity of the bounding geometry increases the overhead of rendering.

The intersection of regions defined by the three types of bounding information is determined and the depth ranges are obtained for the rays. FIG. 1 illustrates multiple contributors to the depth range buffer: including embedded object 101, bounding boxes of non-empty blocks 102, and cut-planes 103. Note that crop-boxes and near/far planes may be replaced by one or more cut-planes.

Except for the existing depth buffer, all bounding geometries are rendered as flat polygons. Each plane is rendered as a single polygon. A facing direction for each polygon is defined. For a cut-plane, the facing direction is the one towards the excluded half space. Similarly, the faces of the crop-box of a volume are directed away from the volume. The near plane is faced towards the camera, while the far plane is faced away. All the polygons are classified into two groups: front-facing, and back-facing, and they are used to compute the near and far depth buffers respectively.

Figure 2:
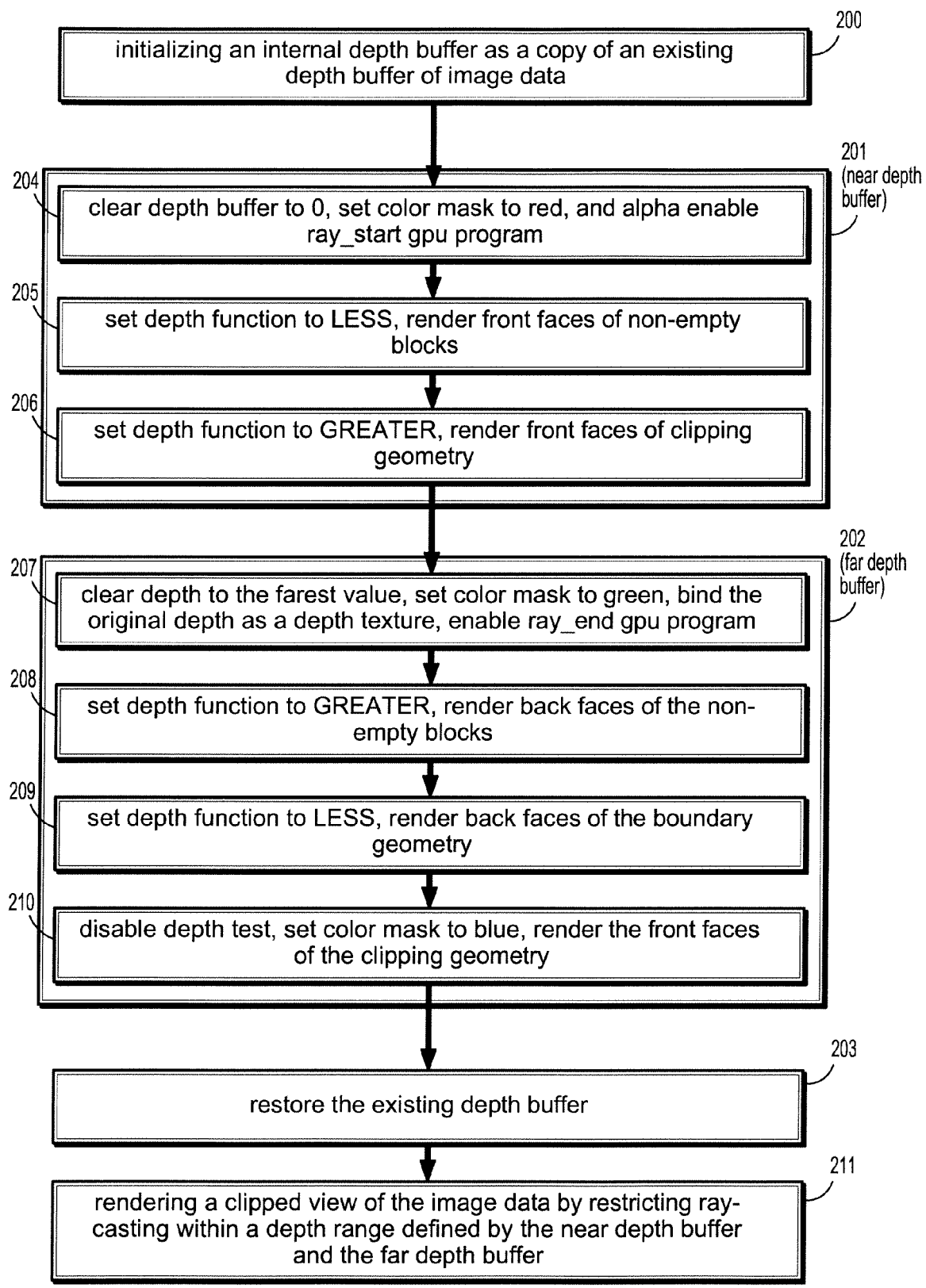
FIG. 2 is a flow chart for creating a depth range buffer according to an embodiment of the present disclosure.

The common region of arbitrary number of cut-planes is guaranteed to be a convex-shaped region or completely empty. Besides, all these planes are guaranteed to generate a closed mesh that encloses the visible portion of the volume. Therefore, only two depth values per pixel are sufficient to accurately define the common region of all cut-planes. The two depth values for each pixel are either both valid or both invalid. Referring to FIG. 2, to obtain the near buffer 201, all the front-facing planes are rendered and the depth-test function is set to GREATER to obtain the largest depth 206. Similarly, to get the far depth buffer 202, all the back-facing planes are rendered and the depth-test function is set to LESS to get the smallest depth 209. Flags are maintained for each pixel to indicate whether depth values are valid.

There could be multiple non-empty blocks and the union (not intersection) of the regions defined by those blocks is considered. The shape of the union of multiple blocks is likely to be concave shaped. In other words, each pixel could correspond to more than one non-empty depth ranges. For efficiency, the variable depth ranges are converted to single depth range. One simple way is to merge multiple ranges into one that will enclose empty voxels among the ranges. As mentioned before, adding empty voxels will not cause any error to the rendering. The other way is to peel the multiple ranges into layers, and each layer only has a single depth range for each pixel.

By intersecting the single depth range derived from clipping geometry with the single depth of computed from the non-empty blocks or one layer of the non-empty blocks, the output is still a single depth-range buffer that defines the clipped non-empty region. The existing depth buffer contains the nearest depth values of any opaque objects rendered before volume rendering. Each pixel only has a single depth value. Any voxel has longer distance to the image plane than these depths is invisible. Therefore, the existing depth is treated as back-facing geometry and are merged into the far depth buffer.

In an exemplary implementation, the depth information and valid range flags are stored in a four-channel RGBA buffer. The red and the green channel stores the near and depth values respectively. The alpha channel stores a flag indicating whether the pixel is modified by the non-empty blocks, and the blue records whether clipping geometry has modified the pixel. In the example implementation, the non-empty bounding boxes are merged into a single depth layer.

FIG. 2 illustrates an exemplary method for creating a single depth range buffer. The method switches to an internal depth buffer so that an original depth buffer is not destroyed 200. A color mask is used to limit the writing to certain channels. For example, set color mask to red will only allow the red channel be modified while keep all the other channels untouched 204. Note that during the process, the depth function is toggled several times according to whether smallest depth or largest depth is needed. The LESS depth function outputs the smallest depth value for fragments falling on the same pixel 205, and the GREATER depth function returns the largest depth value for fragments falling on the same pixel 206. Because, all non-empty blocks are merged into a single layer, the LESS depth function 205 is used for the near buffer 201, and the GREATER depth function 208 is used for the far buffer 202. This is the opposite of rendering the clipping geometry.

When determining the near depth 201, a ray_start GPU program is enabled 204, that takes the depth of the current fragment and writes it to the red channel, and sets a flag in the alpha to indicate that the near depth has been set 205. For the far depth buffer 202, the ray_end GPU program accesses the original depth buffer containing the depth information generated by the embedded objects 207. For each fragment generated by the back faces, the ray_end GPU program checks whether the depth of the fragment is less than the depth of the embedded object. If the depth of the fragment is less than the depth of the embedded object the depth is written to the green channel. The front faces of the clipping geometry are rendered one more time with depth-test disabled to flag the blue channel that contains validity information of the far depth values 210. The original depth buffer may be restored 203. A clipped view of the image data may be rendered by restricting ray-casting within a depth range defined by the depth range buffer 211.

The clipping geometry includes an arbitrary number of user defined cut-planes, six faces of the crop-box, and the near and far planes. User-defined cut-planes and the near/far planes are treated in a similar way. In principal, each plane/face is intersected with all other planes and faces, and the resulting polygon may be rendered. In practice, the difference between planes and faces are utilized. Planes are infinite while each one of the six faces is defined by a rectangle. And the intersection of a face with a plane is restricted to within the rectangle. The intersections among the six faces are already known as the twelve edges of the crop box. Therefore, for the crop-box, each of the six rectangles is rendered, intersected by all the cut-planes. For each cut-plane, the plane is intersected with the 12 edges of the crop-box to obtain a polygon. If less than three intersection points are found, the polygon does not exist, which means the cut-plane is completely outside the crop-box or touch the crop-box by a vertex or an edge. In such a case, the cut-plane either excludes no voxel or all voxels. The plane can be ignored if it excludes no voxel. In the case where all voxels are excluded by the cut-plane, the intersection of the crop-box faces with the plane is empty as well, and the depth range of all pixels are set to zero by the crop-box faces, and there is no need to render the cut-plane geometry, which further reduces the depth range. If there is a non-empty polygon for a cut-plane after intersecting the plane, the cut-plane polygon is clipped by all other cut-planes. The clipping is done in the CPU. The cut-plane polygon is rendered if it is still non-empty after all the clippings.

Figure 3:
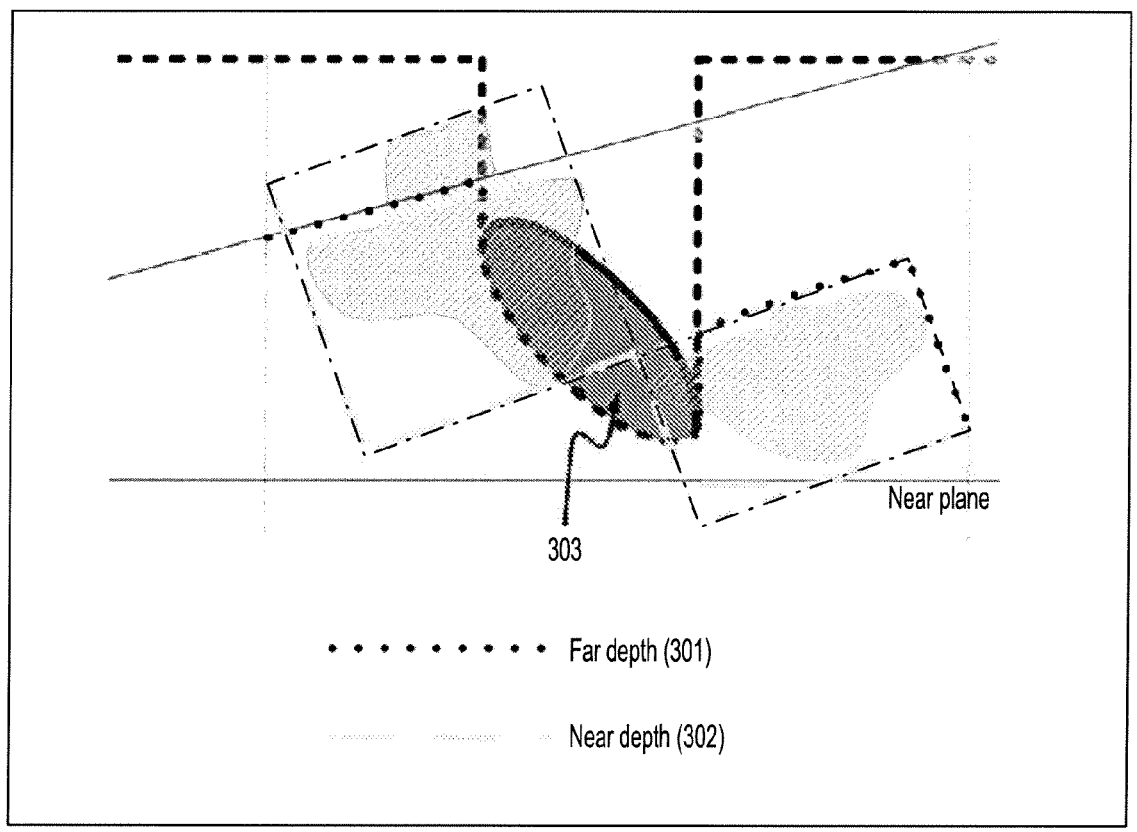
FIG. 3 is rendering of a near and far depth according to an embodiment of the present disclosure.

FIG. 3 shows the resulting far depth 301 and near depth 302 computed from the same bounding information shown in FIG. 1. In certain ranges, a near depth value can be greater than the corresponding far depth (e.g., 303). In such a case, the depth range is considered invalid, and no ray casting is performed in the range.

During ray-casting, the ray-buffer is loaded as a texture to be accessible to the ray-cast GPU program. For each pixel, when both the blue channel and the alpha channel flags are set, and the far depth is greater than the near depth, the near and far depth values are considered valid. A ray is cast from the near depth until the far depth, compositing volume samples. For a ray-casting supporting empty space skipping but no clipping, the ray buffer is only computed from the non-empty blocks, and the usage of the near and far depth is similar. Therefore, our approach could be based on such an algorithm, and only modifying the step of creating the depth range buffer, and leave the ray-casting GPU program unchanged. The GPU program implementing the ray-casting loops is the most time consuming part of the whole rendering process, because most, if not all, computations within the program applies to every volume sample. Adding any per-sample operation could significantly slow down the rendering. In addition, our approach reduces the depth range by intersecting the non-empty region with the region defined by clipping geometry. It essentially reduces the number of samples visited inside the ray-cast program. Even if the cost for doing the clipping test inside the ray-cast loop is zero, our approach still has its speed advantage. Although GPU-based ray-casting is disclosed, embodiments can be applied to CPU-based ray-casting. With a depth range buffer containing the combined results of all bounding information, clipping is supported in ray-casting.

According to an embodiment of the present disclosure, for cut-planes, crop-boxes, and embedded objects may be supported in ray-casting by modifying a process of depth range buffer generation to contain the staring and end points of each ray by reducing the depth range, and without modifying the ray traversal loop or the fragment program in the GPU version. It has significant speed advantage over an approach that does the clipping tests inside the ray-casting loop. It also avoids the trouble of sending variable number of cut-plane parameters to GPU program.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
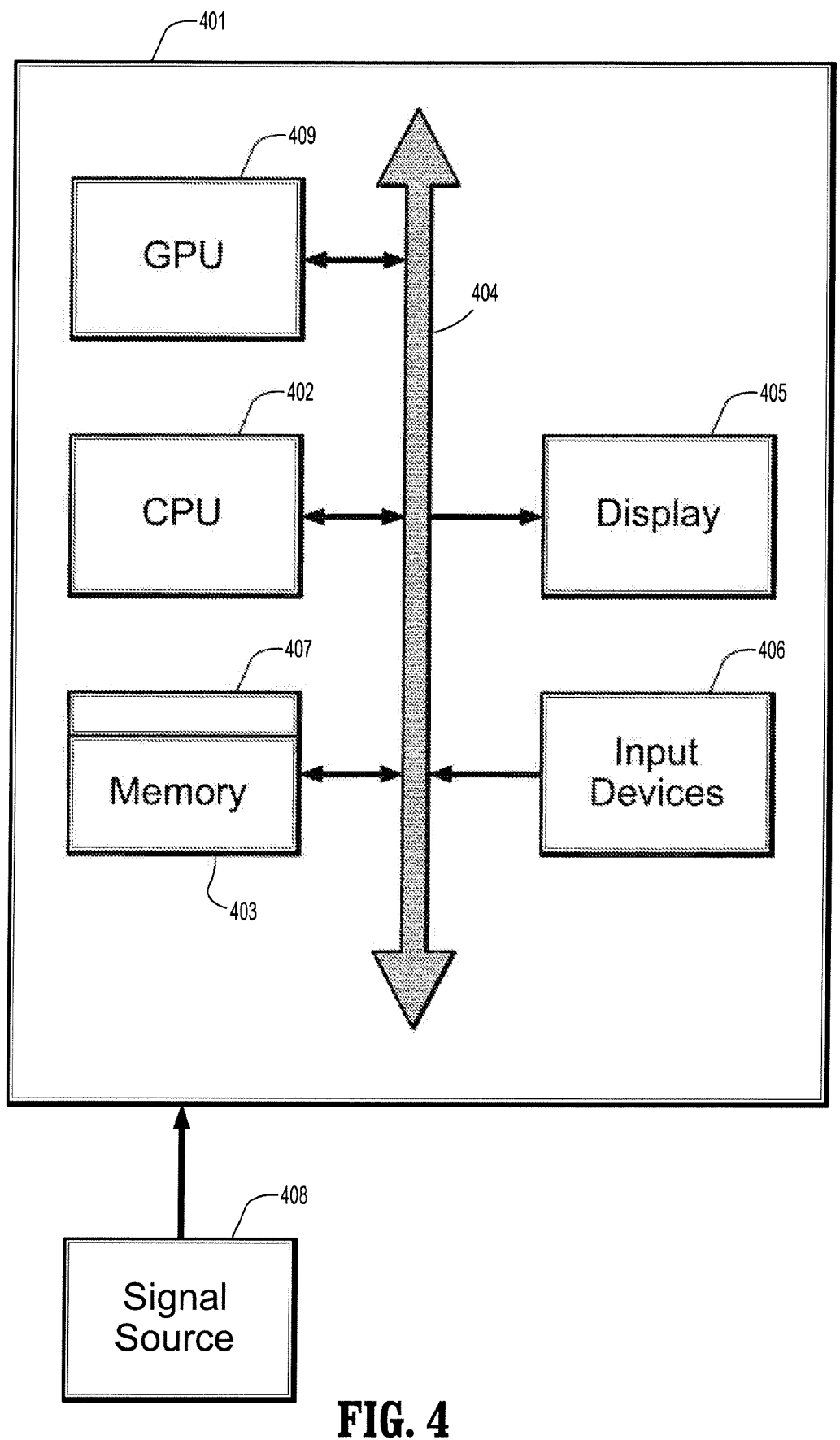
FIG. 4 is a computer system for implementing a GPU-based ray-casting method according to an embodiment of the present disclosure.

Referring to FIG. 4, according to an embodiment of the present invention, a computer system 401 for supporting clipping geometries for GPU-based ray-casting can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process the signal from the signal source 408. The computer system 401 further includes a graphics processing unit (GPU) 409 for processing graphics instructions, e.g., for processing the signal source 408 comprising image data. As such, the computer system 401 is a general purpose computer system that becomes a specific purpose computer system when executing the routine 407 of the present invention.

The computer platform 401 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for supporting clipping geometries for GPU-based ray-casting, it is noted that modifications and variations can be made by persons skilled in the art in light of the above teachings. It is therefore to be understood that changes may be made in embodiments of the present disclosure that are within the scope and spirit thereof.

What is claimed is:

1. A computer implemented method for creating a depth range buffer for supporting clipping geometries in ray-casting comprising:

receiving image data to be rendered, the image data comprising an existing depth buffer of blocks;

determining a depth range buffer comprising a first depth buffer for start points a second depth buffer for end points corresponding to the start points, wherein the start points are each determined to be located at a farther of a near non-empty block and a first clipping geometry and the end points are each determined to be located at a nearer of a far non-empty block, a boundary geometry and a second clipping geometry, wherein a pair of start and end points define a path of a ray to be cast; and rendering a clipped view of the image data by restricting a ray-casting within a predetermined depth range defined by the depth range buffer.

2. The computer implemented method of claim 1, wherein the bounding geometries include information for a non-empty block boundary.

3. The computer implemented method of claim 1, wherein the first clipping geometry includes information about at least one of a cut-plane, a crop-box, and a near plane.

4. The computer implemented method of claim 1, wherein the second clipping geometry includes information about at least one of a cut-plane, a crop-box, and a far plane.

5. The computer implemented method of claim 1, wherein the bounding geometries include information for the existing depth buffer.

6. The computer implemented method of claim 1, further comprising making a copy of the existing depth buffer and restoring the existing depth buffer after determining the depth range buffer.

7. A non-transitory computer readable storage medium having program instructions stored thereto for implementing the computer implemented method claimed in claim 1 when executed in a digital processing device comprising a graphics processing unit.

8. A computer implemented method for creating a depth range buffer for supporting clipping geometries in ray-casting comprising:

inputting image data;

establishing a depth range buffer comprising a near depth buffer and a far depth buffer specifying start and end points of each ray, respectively;

determining values of the near depth buffer of the image data corresponding to the start point of each ray, wherein the start points are each determined to be located at a farther of a near non-empty block and a first clipping geometry;

determining values of the far depth buffer of the image data corresponding to the end point of each ray, wherein the end points are each determined to be located at a nearer of a far non-empty block, a boundary geometry and a second clipping geometry;

clipping the volume by restricting ray-casting within the start and end points of the depth range buffer; and rendering a portion of the image data corresponding to the depth range buffer defined by the near depth buffer and the far depth buffer.

9. The computer implemented method of claim 8, wherein computing the near depth buffer of the image data comprises:

clearing the depth range buffer to zero;

setting a color mask to a first color;

setting a depth function to LESS for determining front faces of the near non-empty blocks of the image data; and setting the depth function to GREATER for determining front faces of the first clipping geometry of the image data.

10. The computer implemented method of claim 8, wherein computing the far depth buffer of the image data comprises:

clearing the depth range buffer to a farthest value of the image data;

setting a color mask to a second color;

binding an original depth of the image data as a depth texture;

setting a depth function to GREATER for determining back faces of the far non-empty blocks of the image data; and setting the depth function to LESS for determining back faces of the boundary geometry of the image data.

11. The computer implemented method of claim 10, further comprising:

setting the color mask to a third color for validating the far depth; and render the front faces of the second clipping geometry.

12. The computer implemented method of claim 8, wherein the first clipping geometry includes information about at least one of a cut-plane, a crop-box, and a near plane.

13. A non-transitory computer readable storage having program instructions stored thereto for implementing the computer implemented method claimed in claim 8 when executed in a digital processing device comprising a graphics processing unit.

14. The computer implemented method of claim 8, wherein the second clipping geometry includes information about at least one of a cut-plane, a crop-box, and a far plane, wherein the far plane is the boundary geometry.

* * * * *